Patent 3,361,961

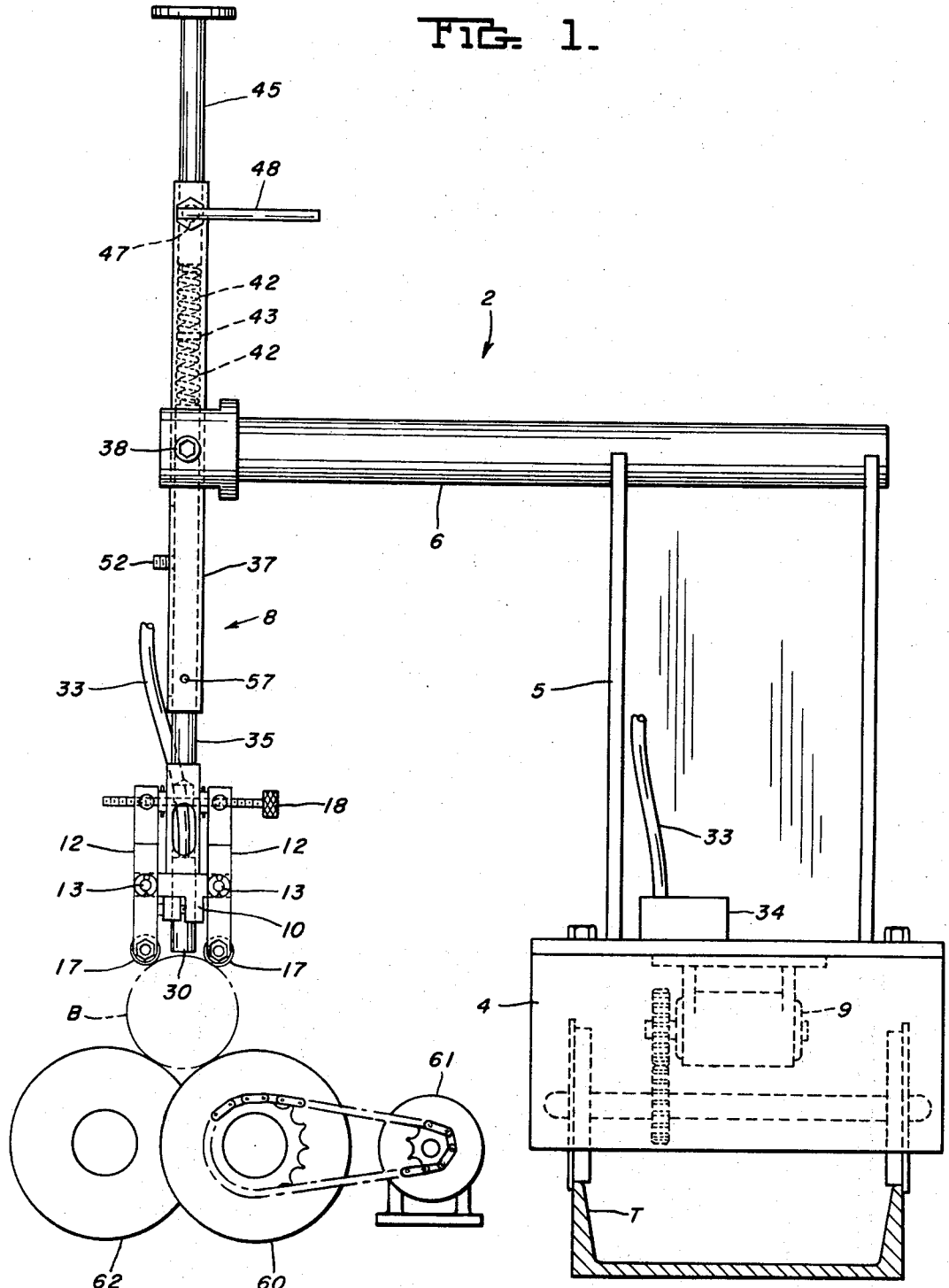

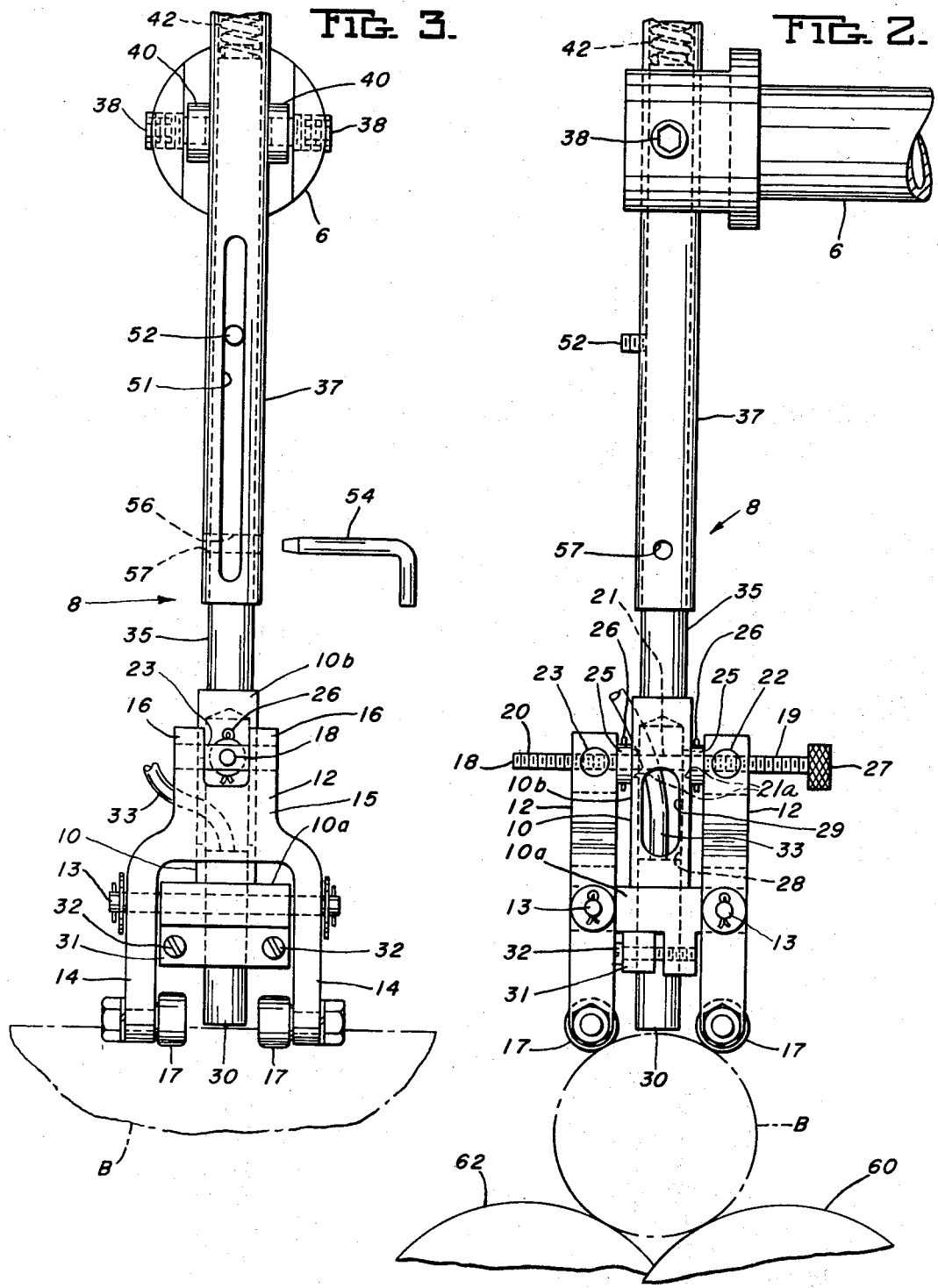

PROBE SUPPORTING APPARATUS WITH PIVOTABLY ADJUSTABLE LEGS

Ralph H. Zoellick, Lansing, Ill., assignor to United States Steel Corporation, a corporation of Delaware
Filed Oct. 27, 1964, Ser. No. 406,789
8 Claims. (Cl. 324—40)

This invention relates to apparatus for inspecting the surfaces of round bars for defects such as slivers, laps, seams, pits, and scabs.

The apparatus is of the type that detects these surface imperfections by means of a magnetic probe that is held a predetermined distance from the inspected surface. The probe is carried along the length of the bar during the inspection, and the bar is also rotated at the same time. The probe contains an electromagnet which causes magnetic lines of force to pass through the bar stock being inspected. The probe also contains a pick up detector coil which is part of an indicating circuit. Defects in the bar stock being inspected produce a corresponding change in the characteristics of the indicating circuit. The distance between the probe and the surface of the bar is very critical, and it is important that this distance remain fixed, or the probe will not function properly.

In the past, it has been difficult to hold a probe a fixed distance from a bar during its inspection, since the bars are never perfectly straight and often have other irregularities which make difficult the maintenance of the proper probe distance. The apparatus disclosed herein solves this problem by means of a probe holder which rides on the curved surface of a rotating object and responds by both horizontal and vertical movement to the changing positions of the bar surface that result from the camber of the bar and its other irregularities.

It is therefore an object of my invention to provide bar inspecting apparatus that possesses the above mentioned capabilities, and will maintain a probe a fixed distance from the inspected surface, while the surface is rotating and the apparatus is being moved along the length of the bar.

Another object of my invention is to provide a bar inspecting apparatus that can be adjusted to support a probe a fixed distance from many different sizes of bars.

These and other objects will appear more readily from the following detailed description of my invention and the attached drawings in which:

FIGURE 1 is a side elevation of the bar inspecting apparatus of my invention showing a round bar being inspected;

FIGURE 2 is an enlarged side elevation of part of the bar inspecting apparatus of FIGURE 1; and FIGURE 3 is an end elevation of the bar inspecting apparatus of FIGURE 2.

Referring to FIGURE 1, apparatus 2 for inspecting a bar B includes a wheeled vehicle 4 riding on the flanges of a channel member or other suitable tracks T, a bracket 5 on top of the vehicle 4, a horizontal beam 6, and a probe supporting assembly 8. The vehicle 4 is self-propelled by means of an electric motor 9 mounted thereon.

As seen better in the enlarged views of FIGURES 2 and 3, the assembly 8 includes a probe holding member 10 and yokes 12. The body member 10 is in the shape of an inverted T, having a wide base portion 10a and a narrower top portion 10b. The yokes 12 are pivotally connected by pins 13 to the wide portion 10a of the body member 10. Each yoke 12 includes two legs 14 (FIGURE 3) and a top portion 15 with upwardly extending ears 16. On the bottom of each leg 14 is mounted a roller 17, which rides upon the bar B and rotates about an axis parallel to the axis of the bar.

To enable different sizes of bars to be handled by the inspecting apparatus 2, the positions of rollers 17 are made adjustable by means of a screw 18. This screw has a right-hand threaded portion 19 on its right side, as viewed in FIGURE 2, a left-hand threaded portion 20 on its left side, and an unthreaded middle portion 21 rotatable within slots 21a (FIGURE 2) in the top portion 10b of probe holding member 10. The right hand threaded portion 19 is threadably engaged in a hole in shaft 22, and the left-hand threaded portion 20 is threadably engaged in a hole in shaft 23. The shafts 22 and 23 are rotatable within holes in ears 16 of yokes 12. The screw 18 is free to move a limited distance vertically in slots 21a, but it is prevented from sliding axially within the member 10 by means of collars 25 secured to the screw with cotter pins 26 on either side of the member 10. By turning knob 27 on the end of screw 18, the shafts 22 and 23 will be moved either toward or away from the probe holding member 10 by the same distance. This movement will cause a corresponding rotation of the attached yokes 12, thereby moving rollers 17 closer together or farther apart, depending on which way the screw 18 is turned.

A vertical hole 28 in member 10 extends upward from the bottom end of the member, and a horizontal hole 29 intersecting the hole 28 is drilled through the top portion 10b. A probe 30 is inserted in the hole 28 and is clamped to the member 10 by means of a clamp member 31 and screws 32. The bottom of the probe is spaced a short distance from the surface of bar B. The probe 30 is magnetically energized by electric power from cable 33, which passes through hole 29 and leads to a power supply and detecting meter 34, mounted on the vehicle 4 (FIGURE 1). The middle section of cable 33, which is preferably taped to the beam 6, is broken away in FIGURE 1 for the sake of more clearly showing the other parts of the apparatus. The probe 30 directs its magnetic field downward toward the bar B being inspected. Any eddy currents resulting from the field passing over a surface defect are sensed by the probe and carried back through the cable 33 to the meter 34.

This manner of detecting surface imperfections requires that the probe 30 remain a fixed distance from the surface of the bar B as it is moved along the bar, even where the shape of the bar varies from a true cylinder. In order to adjust the position of the probe to such variations, the probe supporting assembly 8 also includes a vertical rod 35 fixed to the top of the probe holding member 10, and a vertical tube 37 in which the rod 35 is slidably held. The tube 37 is pivotally mounted on the end of horizontal beam 6 by means of two socket screws 38 which fit within bearings 40 on opposite sides of the tube (FIGURE 3). Compression springs 42 separated by a spacer 43 are provided within tube 37 above the rod 35 (FIGURE 1). A plunger 45 fits into the top end of tube 37 and is pressed downwardly upon the springs 42 to maintain the desired amount of compression therein. The plunger 45 is held in position by a set screw 47 which is threadably secured in the side of tube 37. A handle 48 is provided on set screw 47 so that the screw may be easily tightened by hand.

The rollers 17 on the bottoms of yokes 12 are thus held against the surface of bar B by means of compression springs 42 bearing against the rod 35. Furthermore, the rollers 17 are free to move upward against the springs whenever caused to do so by the camber and other irregularities in the shape of bar B. Also, due to the pivotal connection of tube 37 on shaft 6, the rollers 17 are free to be carried from side to side by the same irregularities.

As seen in FIGURE 3, a slot 51 is provided in the side of tube 37, and a pin 52 protruding from rod 35 rides within the slot 51. The bottom end of slot 51 serves as a lower limit for movement of rod 35 and attached probe holding member 10. This insures that the rod 35 will not fall out of the tube 37 when the bar B is removed. The pin 52 also prevents the rod 35 and probe holding member 10 from rotating about the axis of the rod, and provides a means for raising by hand the probe holding member 10 whenever the bar B is to be removed or a new bar is to be placed under the probe 30 for inspection. When the inspecting apparatus 2 is not in use, the rod 35 is held against sliding movement in tube 37 by means of a pin 54 (FIGURE 3), which fits through holes 56 and 57 in the rod 35 and tube 37, respectively. This permits the probe 30 to be held in an elevated position where it is less likely to be damaged by accidental contact with a bar that is being placed under it for inspection.

In use, a bar B is placed underneath the probe 30 with one side resting upon a series of rubber-faced rollers 60, driven by a motor 61, and the other side supported by a series of rubber-faced idler rollers 62 (FIGURE 1). The pin 54 is then removed and the rod 35 carrying probe holding member 10 is allowed to slide downward until rollers 17 rest against the surface of the bar B, with the probe 30 elevated a short distance above the bar. The distance between the rollers 17 is then adjusted by turning knob 27 on screw 18, until the spacing between the rollers is such that the probe holding member 10 will be carried firmly on top of the bar B.

The bar B is rotated by means of driven rollers 60, and the wheeled vehicle 4, driven by motor 9 along track T, carries the entire inspection apparatus 2 along the length of bar B. The magnetic probe 30 senses any surface defects along the length of the rotating bar. Meanwhile, the springs 42 pressing against rod 35 force the rollers 17 against the bar B, allowing the rollers and probe 30 to move up or down with the slightest change in the elevation of the surface of the bar B. Also, the pivotal connection of tube 37 to shaft 6 allows the rollers 17 and probe 30 to be swung from side to side as dictated by corresponding movements in the surface of bar B. Thus the probe 30 at all times remains a fixed distance from the surface of the bar B, despite the camber and other irregularities in the shape of the bar.

While one embodiment of my invention has been shown and described it will be apparent that other adaptations and modifications may be made without departing from the scope of the following claims.

I claim:

1. Apparatus for supporting a probe a fixed distance from the surface of an object having a generally cylindrical shape and rotating about a longitudinal axis, said apparatus comprising a probe holding member, yokes pivotally connected to said probe holding member about axes substantially parallel to the axis of said object, each yoke having two legs with means engageable with said surface of the object, said legs extending from the pivotal connections of said yokes with said probe holding member in directions substantially toward the axis of said object, said yokes having top portions above said axes, means for holding said yokes in fixed positions, said last-named means engaging said top portions of the yokes and adjustable to change the distance between said means on said legs engageable with said surface of the object, and means for preventing said probe holding member from rotating with said object, said last named means permitting said member to be shifted up and down and from side to side to conform to like variations in the surface of said rotating object at the places of engagement of said legs therewith.

2. Apparatus according to claim 1 wherein said means for holding said yokes in fixed positions includes a rod extending through said probe holding member and having left and right hand screw threads respectively on its end portions on opposite sides of said member and a middle portion rotatable within said member and held against axial sliding therethrough, and said end portions threadably engaging said top portions of the yokes so that the rotation of said rod will effect a change in the distance between said means on said legs engageable with said surface of the object.

3. Apparatus according to claim 2 in which said means on said legs engageable with said surface of the object are rollers rotatably mounted on said legs about axes parallel to said axis of the object.

4. Apparatus according to claim 3 including means for moving said probe holding member parallel to said axis of the object.

5. Apparatus according to claim 1 wherein said means for preventing the rotation of said probe holding member includes a tube suspended over said object with its longitudinal center line perpendicular to the axis of the object, and a rod fixed to said member and extending upwardly therefrom into said tube, said rod being slidable within said tube.

6. Apparatus according to claim 5 including a vehicle movable in a direction parallel to said axis of the object, and means pivotally connecting said tube to said vehicle about an axis parallel to the axis of the object.

7. Apparatus according to claim 5 including compression means pressing against the upper end of said rod in said tube to maintain said engagement means of said legs in contact with the surface of said object, and means for adjusting the amount of compression in said compression means.

8. Apparatus according to claim 7 including means to restrain said rod from rotating within said tube, and means for limiting the downward travel of said rod within said tube.

References Cited

UNITED STATES PATENTS

| | | | |
|---|---|---|---|
| 2,476,943 | 7/1949 | Brady | 324—64 |
| 2,878,447 | 3/1959 | Price et al. | 324—37 |
| 3,170,114 | 2/1965 | Placke | 324—37 |

FOREIGN PATENTS 594,158  11/1947  Great Britain.

RUDOLPH V. ROLINEC, *Primary Examiner.*

RICHARD B. WILKINSON, *Examiner.*

R. J. CORCORAN, *Assistant Examiner.*